United States Patent Office 2,736,457
Patented Feb. 28, 1956

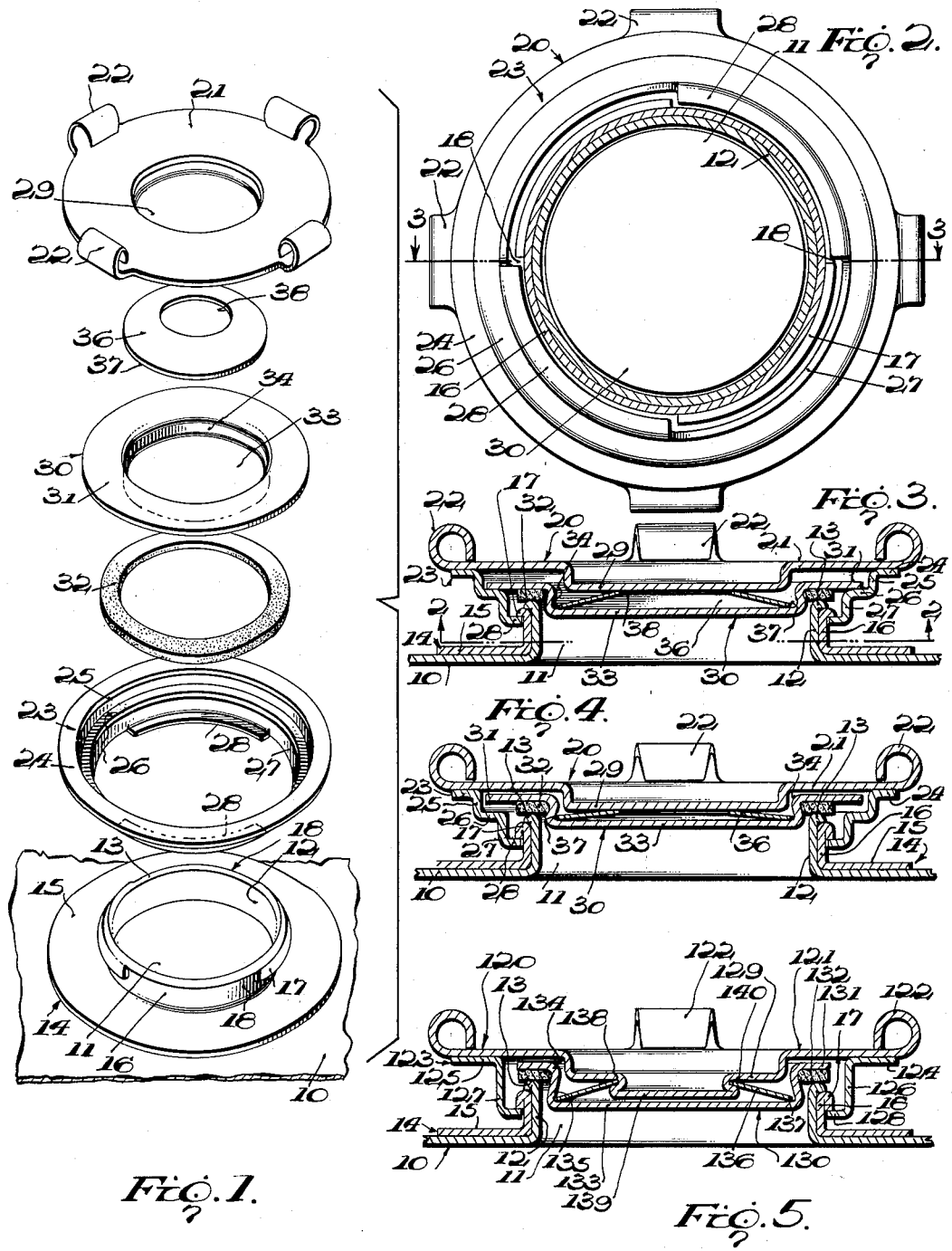

2,736,457

SPRING LOADED SEALING MEANS

Charles Warren Hurley, Gaithersburg, Md., assignor to the United States of America as represented by the Secretary of the Army Application December 10, 1954, Serial No. 474,631

1 Claim. (Cl. 220—40)

The invention relates to container closures and more particularly to bayonet slotted, screw threaded or like closure plugs or caps for metal drums or the like.

In the conventional metal drum, a flange or sput defines an opening and is fixed in a generally annular embossment formed in the head or a wall of the drum. A sealing washer or gasket is carried by the closure plug or cap and as the latter is seated is forced thereby into sealing engagement with a gasket seat on the sput or on the embossment. This structure includes a relatively rigid gasket-seat on the cap or plug. The seal thereby provided makes no provision for "compression set" in the gasket after the seal has been maintained for relatively long periods. This "setting" is particularly prevalent in the synthetic rubbers or elastomers which are widely used at present and which are even necessary where the drum contains petroleum products which actively attack natural rubber.

For instance, current federal specifications for gasket materials used on 55 gallon drums permit a 40% compression set in a gasket after being compressed for 22 hours at 158° F. The closures for such drums must be able to withstand hydrostatic pressures up to 30 p. s. i. without leakage. The closure should be capable of withstanding up to 50 cycles of temperature fluctuation from —65° to 160° F. without leaking or "breathing." Additionally, the gasket material must survive temperature and solvent tests before it is universally acceptable. The synthetic rubbers able to pass such temperature and solvent tests inevitably have the undesirable compression set characteristics mentioned above.

Thus, to maintain an acceptable seal in spite of the compression set qualities of the gaskets, it has been suggested that the closures be modified to incorporate resilient means exerting a continuous resilient pressure on the gaskets.

With the foregoing in view, it is an object of the invention to provide an improved closure for a container which includes improved resilient means for imposing a resilient load on the gasket at all times when the closure is in a seated position.

A further object is to provide such a closure wherein the resilient means comprises a resilient frustro-conical disc or "Belleville" spring which is interposed between a gasket mounting sealing member and actuating means for the latter so that said spring is at least partially compressed as said actuating member is seated and resiliently holds said sealing member in a seated position.

Other objects and advantages reside in the particular structure of the invention, the structure of the several elements thereof, combinations and subcombinations of such elements, all of which will be readily apparent to those skilled in the art upon reference to the attached drawing in connection with the following specification wherein two embodiments of the invention are shown, described and claimed.

In the drawing:

Fig. 1 is an exploded perspective view of a preferred form of the invention and the associated portions of a container;

Fig. 2 is a horizontal sectional view taken substantially on the plane of the line 2—2 of Fig. 3;

Fig. 3 is a transverse sectional view taken substantially on the plane of the line 3—3 of Fig. 2 showing the parts in the unseated position;

Fig. 4 is a view like Fig. 3 but showing the parts in the seated position; and

Fig. 5 is a view like Fig. 4 but showing a modification of the invention.

Referring specifically to the drawing, wherein like reference characters have been used throughout the several views to designate like parts, and referring at first to the form of invention illustrated by Figs. 1–4, 10 designates generally a wall of any suitable container having an opening 11 formed therein which is defined by a neck 12. The upper edge of the neck 12 is formed to provide an outwardly directed bead 13 which provides a gasket seat. A flange or sput 14 surrounds the neck 12 and comprises the usual horizontal flange 15 and upwardly directed neck 16 having the upper edge formed with a downwardly directed flange 17. The bead 13 on the neck 12 overlies the upper edge of the neck 16 to secure the sput to the wall 10 in a well known manner. In the preferred embodiment illustrated, opposite portions of the flange 17 are cut away to provide bayonet slots 18. As so far described, the structure is conventional and forms no part of my invention.

The closure according to the invention comprises an actuating member 20 which may comprise a top piece or disc 21 which is preferably formed with any suitable tool-engaging means such as the upwardly curled lugs 22. A sealing means mount is generally designated by 23 and may comprise an annular top flange 23 which is rigidly and permanently secured to the undersurface of the disc 21 concentrically thereof by any suitable means such as spot welds, not shown. The inner edge of the flange 24 is downwardly directed to provide an outer cylindrical shoulder 25 which in turn includes a lower edge which is radially inwardly directed to provide an annular flange 26 for supporting a sealing means to be described later. The inner edge of the flange 26 is downwardly directed to provide an inner cylindrical shoulder 27 which terminates in a pair of radially inwardly directed arcuate bayonet slot lugs 28. If desired, and for a purpose to be designated later, a central portion of the top disc 21 may be downwardly dished as at 29.

The sealing means for the device is generally indicated by 30 and comprises a disc or plate which includes an annular marginal flange 31 which includes an edge portion overlying the outer cylindrical shoulder 25 of the actuating member. Thus, the sealing disc or plate 30 is free to move axially of the actuating member within the limits defined by the flange 26 and the top disc 21. Inwardly of the inner cylindrical shoulder 27 of the actuating member 20, the marginal portion 31 of the sealing plate has mounted thereon any suitable sealing gasket 32. The gasket 32 surrounds the outer wall 34 of a downwardly dished center portion 33 of the sealing plate 30.

To load the sealing disc or plate 30 and gasket 32 carried thereby into continuous resilient engagement with the gasket seat or bead 13, there has been provided a hollow frustro conical spring disc or Belleville spring 36. Such spring 36 is disposed in the recess 33 of the sealing plate 30 and has a base or outer edge portion 37 which rests on the floor of the recess 33. The spring disc 36 includes an inner or frustrum edge 38 which normally bears upon the undersurface of the dished portion 29 of the actuating member 20.

As is apparent, from a comparison of Figs. 3 and 4, when the actuating member is applied to the closure by inserting the bayonet slot lugs 28 into the vertical portions of the bayonet slots 18, the washer 32 will rest lightly atop the gasket seat 13. In this position, Fig. 3, the marginal portion 31 of the sealing plate is resting on the annular flange 26 of the actuating member and the outer edge 37 of the Belleville spring 36 is clear of the wall 34. However, as the actuating member is given a partial turn on its axis it is drawn downwardly by the bayonet slots 18 so that the Belleville spring is partially flattened as shown in Fig. 4. This action, of course, imparts a continuous resilient pressure onto the sealing plate 30 whereby to compensate for compression set in the gasket 32.

In the form of invention of Fig. 5, a similar arrangement is disclosed. In this form of the invention, an actuating member 120 which includes a top disc 121 having tool-engaging means 122 has secured thereto any suitable means such as the bayonet slot lugs 128 for engaging the bayonet slots 18 of the sput 14. The central portion of the top disc 121 may be downwardly dished as at 129 and the recess thus formed may be provided with a further axial recess 139, the outer wall of which is preferably formed with an outwardly directed annular groove 140 in which is seated the inner or frustrum edge 138 of a Belleville spring disc 136. The base edge 137 of the disc 136 is disposed in an inwardly directed groove 135 formed in the cylindrical wall 134 of the sealing plate 130. The sealing plate 130 also includes an annular flange 131 which overlies the gasket seat 13 and which mounts the usual annular gasket 132. In this form of the invention, the connection between the actuating means 120 and the sealing plate 130 comprises the Belleville spring 136 and the seating of its edges 137 and 138 in grooves 135 and 140. Of course, such grooves are sufficiently deep to prevent complete retraction of the spring edges 137 and 138 therefrom except by the use of considerable force so that a lost motion connection is provided between the parts which is simpler than that of the first-described form of the invention.

This form of the invention operates substantially the same as the first-described form whereby a detailed description of the operation is considered to be unnecessary.

By dishing the sealing plates 30 and 130 the Belleville springs 36 and 136 are confined to positions concentrically of the gaskets so as to exert pressure uniformly to all parts thereof. The dishing of the top discs 21 and 121 at 29 and 129 shortens the axial distance between the top discs and the sealing plates 30 and 130 whereby to permit the use of relatively flat Belleville springs which are flexed by relatively light pressure.

The bayonet slot lugs 128 extend radially inwardly of arcuate walls 126 and 127 which include radially outwardly directed arcuate flanges 124 and 125 which are welded to the undersurface of the actuating member 120.

The Belleville spring used in the invention is preferred over conventional springs because of its load-deflection characteristics. The deflection of a conventional spring will be somewhat proportional to the load placed on it. A Belleville spring can be designed to produce load-deflection characteristics in which the spring will deflect over a relatively wide range with very small changes in the load. This feature occurs after a predetermined initial load is placed on the spring.

On closures according to the invention the spring is so designed that the initial load is put on the spring during the first 25% of the total closing twist of the closure. During the balance of the closing twisting the spring continues to deflect but exerts only a relatively small additional force on the gasket. As the gasket takes a compression set, the spring unflexes slightly but will tend to continue to impose a relatively constant load on the gasket.

On the other hand, if a conventional type spring is used the force on the gasket decreases proportionally with the compression set of the gasket. The Belleville spring also allows greater tolerances in the fabrication of the component parts of the closure for obvious reasons. With the foregoing in view, it is understood that each of the hollow frustro conical springs or spring discs referred to hereinafter in the claim is a Belleville spring having the characteristic of imposing a substantially constant load on its gasket throughout a substantially wide range of deflection of the spring.

At the same time, the bayonet slot connection makes the device extremely fast in operation as only a partial turn of the actuating member 20 is required to seat or unseat either form of the closure.

While I have shown and described what are now thought to be the preferred embodiments of the invention, it is to be understood that the same is susceptible of other forms and expressions. Consequently, I do not limit myself to the precise structures shown and described hereinabove except as hereinafter claimed.

I claim:

In a closure for an opening in a container, the combination with actuating means for moving the closure into and out of an opening sealing position; of a dished sealing plate mounting a sealing gasket, said plate having an endless side wall formed with a radially inwardly facing annular channel, a spring disc of hollow frustro-conical configuration, said disc having a base edge loosely seated in said channel to connect said spring and sealing plate together, said spring having a frustrum edge, said actuating means having a central portion formed to provide a hollow boss integral with said actuating means and depending therefrom axially thereof, a radially outwardly directed annular groove formed in said boss, and said frustrum edge of said spring disc being loosely seated in said groove to connect said spring and actuating means together.

References Cited in the file of this patent

UNITED STATES PATENTS

| | | |
|---|---|---|
| 1,486,064 | Warren | Mar. 4, 1924 |
| 2,602,565 | Regan | July 8, 1952 |
| 2,607,383 | Christophersen | Aug. 19, 1952 |
| 2,643,790 | Quilliman | June 30, 1953 |

FOREIGN PATENTS

| | | |
|---|---|---|
| 638,134 | France | Feb. 14, 1928 |
| 663,950 | Germany | Aug. 17, 1938 |
| 904,232 | France | Feb. 19, 1945 |